United States Patent [19]

Rupp

[11] 4,174,149
[45] Nov. 13, 1979

[54] SECURE FIBER OPTICS COMMUNICATION SYSTEM

[75] Inventor: James A. Rupp, Bowie, Md.

[73] Assignee: The United States of America as represented by the Secretary of the Army, Washington, D.C.

[21] Appl. No.: 723,263

[22] Filed: Aug. 19, 1976

[51] Int. Cl.$^2$ .......................... H04B 9/00; G02B 5/14
[52] U.S. Cl. .................................. 350/96.33; 350/30; 250/199
[58] Field of Search ............ 350/96 WG, 96 R, 96.33; 250/199

[56] References Cited

U.S. PATENT DOCUMENTS

| | | | |
|---|---|---|---|
| 3,700,900 | 10/1972 | Herleikson | 250/199 |
| 3,778,132 | 12/1973 | Pinnow et al. | 350/96 WG |
| 3,841,882 | 10/1974 | Wolf | 350/96 R |
| 3,853,384 | 12/1974 | Pinnow et al. | 350/96 WG |
| 3,981,592 | 9/1976 | Williams | 250/199 |
| 4,000,416 | 12/1976 | Goell | 250/199 |
| 4,070,091 | 1/1978 | Taylor et al. | 350/96.33 |

*Primary Examiner*—Howard A. Birmiel
*Attorney, Agent, or Firm*—John R. Utermohle; Barry N. Young

[57] ABSTRACT

A secure communications system is disclosed which utilizes an optical information signal transmitted over a frangible optical fiber. An alarm signal is continuously transmitted from the information receiver site to the information transmitter site over the same optical fiber. Any attempt to penetrate the optical fiber for the purpose of intercepting the information transmitted therein causes the frangible fiber to shatter, thereby disrupting the alarm signal being received at the information transmitter site. The detection of this condition results in the immediate disabling of the information transmitter.

10 Claims, 3 Drawing Figures

SECURE FIBER OPTICS COMMUNICATION SYSTEM

BACKGROUND OF THE INVENTION

1. Field of the Invention

This invention relates generally to the field communications, and more specifically to the field of secure communications.

2. Description of the Prior Art

There are many applications where it is desirable for one party to communicate with a second party in a manner such that access to the communication is prohibited to all unauthorized parties. It is desirable that this access be prohibited either through accident or by intent, whether overt or covert, and regardless of the degree of sophistication of the unauthorized parties seeking access. In the past, a number of techniques have been utilized to this end. For example, encryption systems have been utilized wherein the message is unintelligible to a party lacking the necessary key, even though access to the communication itself is not prohibited. A second technique commonly employed is to route the communication over a line, access to which is prohibited by some physical means. Typical of this second kind of system, and the one which is considered by the applicant to be most nearly relevant in the prior art to the subject invention, is described in U.S. Pat. No. 3,700,900 to Herleikson. A secure optical fiber transmission system is disclosed therein, which includes the optical fiber encased in a hollow, tubular high voltage transmission line conductor. The high voltage precludes unauthorized access to the data carried by the light beam inclosed therein. The disadvantage of such a system lies in the fact that means for penetrating the high voltage shield are available despite the danger therein, by utilizing techniques known to power distribution utility companies. In such a case, unauthorized access to the communication would be allowed without the knowledge of the communicators. It is desirable to have a secure communications system which insures communication between the intended parties, which prohibits access to the communication to unauthorized parties, and which insures that attempts at penetrating the secure system would be recognized by the intended parties. It is to this end that the present invention is directed.

SUMMARY OF THE INVENTION

It is an object of this invention to provide a communications system wherein access to the communication is prohibited to unauthorized parties.

It is a further object to provide a communications system in which any attempt to penetrate the communications system will be detected.

It is still a further object to provide a communications system in which the communication is terminated upon an attempt to penetrate the communications system by an unauthorized party.

A communications system having these and other advantages may include an information transmitter, an information receiver; a frangible optical fiber connecting the information transmitter to the information receiver; and means for disabling the information transmitter upon an attempt to penetrate the frangible optical fiber.

BRIEF DESCRIPTION OF THE DRAWINGS

The invention, and the description thereof may be more fully understood when read in conjunction with the attached figures wherein.

DESCRIPTION OF THE PREFERRED EMBODIMENT

Figure 1:
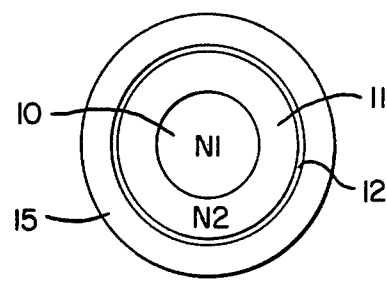
FIG. 1 is a cross sectional representation of a frangible glass fiber suitable for use in the invention.

FIG. 1 is a cross sectional representation of an optical fiber of the type which may be used in the communications system as described herein below. In its simplest form, the fiber includes a glass core region 10, with an index of refraction N1, designated the N1 region, through which all signals are propagated. The N1 region 10 is surrounded by a glass cladding region 11, with an index of refraction N2, designated the N2 region. Typically the index of refraction, N1, of the glass in the core region, is slightly greater than the index of refraction, N2, of the glass in the cladding region. A glass fiber so formed constitutes an optical waveguide which is capable of supporting propagation of optical waves. The N2 region is surrounded by an opaque glass layer 12 which prohibits any signals from being emitted outside of the fiber, and prohibits external observation of any of the signals passing within.

The fiber is then encased in an outer-most region 15, this region comprising a coating of highly stressed, frangible glass. Characteristically, due to the high internal stresses within frangible glass, any attempt to penetrate this glass relieves these stresses and causes the glass to shatter with great force. This force is sufficient to cause not only the frangible coating to shatter but the optical fiber as well. Thus, the construction of the fiber and its coating is such that any attempt to physically penetrate the outer-most layer will result in the shattering of the optical fiber.

Figure 2:
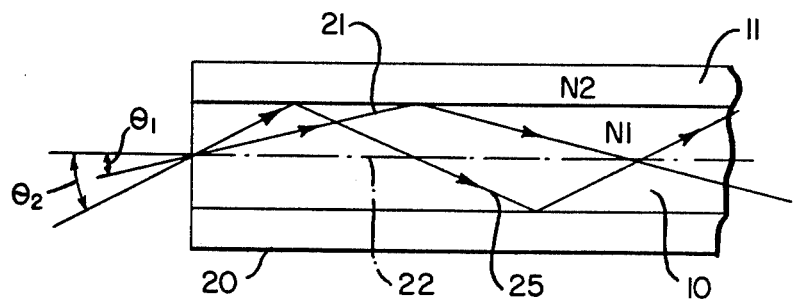
FIG. 2 is a longitudinal section representation of an optical fiber illustrating its function as an optical waveguide.

FIG. 2 is a cross-sectional diagram of an optical fiber 20 consisting of an N1 core region 10, and an N2 cladding region 11, which illustrates the capability of an optical fiber to support multi-mode propagation of optical signals. A beam of light 21 injected into the optical fiber 20 at a small angle $\theta_1$ with respect to the axis 22 of the fiber will propagate through the N1 region until it reaches the N2 region. At this point, it is reflected back into the N1 region. In this manner the beam propagates down the fiber within the N1 region, always crossing the axis 22 of the fiber at the same angle $\theta_1$ at which it was injected into the fiber, as long as the fiber has no bends in it.

A second beam of light 25 injected into the optical fiber 20 at a greater angle $\theta_2$ with respect to axis 22, will similarly propagate down the fiber within the N1 region and always cross the axis 22 of a straight fiber at an angle $\theta_2$. Light beams which cross the axis 22 of the fiber at small angles, e.g. $\theta_1$, are termed low-order propagating modes while those which cross the axis of the fiber at greater angles, e.g. $\theta_2$ are termed high-order propagating modes. By properly positioning light sources and detectors with respect to the axis 22 of the fiber, it is possible to couple to various propagating modes and thereby utilize the same optical fiber for the transmission of independent signals.

In addition, it is also possible to inject different frequency optical signals into an optical fiber and couple to the different frequencies by using frequency sensitive detectors or frequency sensitive mirrors to pass one frequency and reflect a second frequency to a second detector, thereby permitting independent signals to be transmitted over the same optical fiber. Using different frequency optical signals or the multi-mode propagation characteristics of optical fibers, it is possible, for example, to have a duplex (two-way) communication system with two information signals transmitted over a single optical fiber in opposite directions.

Figure 3:
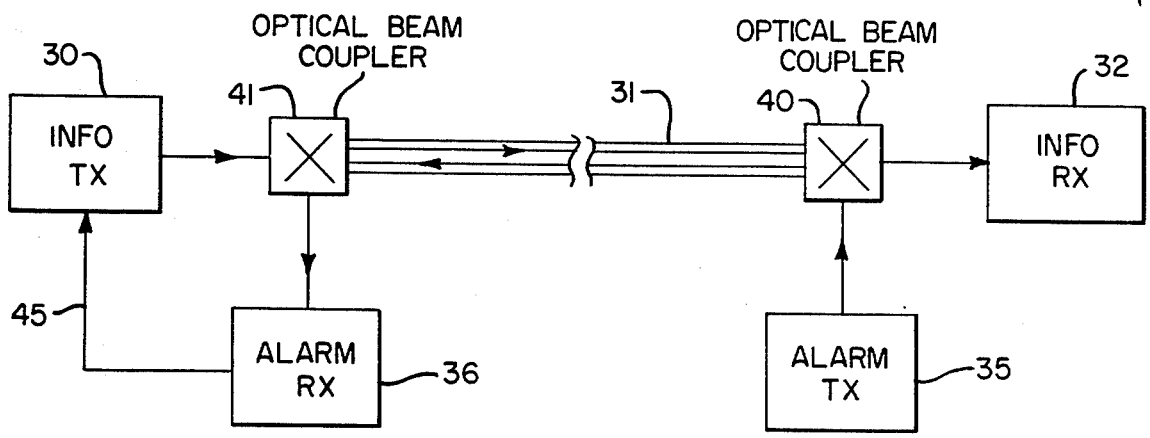
FIG. 3 is a block diagram of a secure communications system embodying the invention.

FIG. 3 illustrates a block diagram of a communications system embodying the frangible optical fiber of FIG. 1 in a secure system. The system includes an information transmitter 30 coupled by a frangible optical fiber 31 to an information receiver 32. At the site of the information receiver is an alarm transmitter 35 which provides optical signals over the same optical fiber 31 to an alarm receiver 36 located at the site of the information transmitter 30. An optical beam coupler 40 at the site of the information receiver and a similar optical beam coupler 41 at the site of the information transmitter couple to the optical signals transmitted over the optical fiber 31. The information signals are coupled from the information transmitter 30 through optical beam couplers 40 and 41 to the information receiver 32. Similarly, the alarm signals are coupled from the alarm transmitter 35 through optical beam couplers 40 and 41 to the alarm receiver 36. A control line 45 connects the alarm receiver to the information transmitter.

Communications are carried on between the information transmitter and the information receiver in the usual way. The signals from the alarm transmitter to the alarm receiver may be of any optical frequency, with the restriction however, that if the alarm and information signals are of the same frequency, then it is necessary that they be of different order propagating modes in order to prevent interference between them and to permit their separation by the optical beam couplers. It is preferable that the information signals be propogated in a low order mode. Low order modes experience less losses in propagation through the fiber than do high order modes, which results in less dispersion of the signal and therefore improves the signal to noise ratio at the information receiver.

The alarm signal is continuously transmitted from the alarm transmitter 35 to the alarm receiver 36 throughout the time of transmission of the information signals. The alarm signal is monitored by the alarm receiver such that any disruption in the signal will be immediately detected. So long as the alarm signal is received, it may be conclusively assumed that the frangible optical fiber is intact and there has been no penetration of the fiber along its route. Upon disruption of the alarm signal either by accidental breaking of the frangible fiber or by an attempt at unauthorized penetration of the fiber, the alarm receiver will detect the absence of the signal being transmitted by the alarm transmitter. An immediate signal is conveyed over control line 45 to the information transmitter 30, causing that transmitter to be disabled. A visual or audible alarm may also be provided to inform operating personnel of the occurence of this condition. In this way, any danger of unauthorized access to the information signals is eliminated.

Optical couplers 40 and 41 may be implemented in a variety of ways known to those skilled in the art. For example, coupling to the various propagating modes in the fiber may be accomplished by using conventional optical techniques to inject light beams into the fiber at various angles in order to generate the various orders of propagating modes and similarly to couple to the various modes at the output of the fiber.

As an alternative embodiment, optical couplers 40 and 41 may consist of nothing more than frequency sensitive mirrors positioned at an angle, e.g. 45 degrees, with respect to the axis 22 of the fiber. The frequencies of the information and alarm signals must then be chosen such that the information signals are passed through the frequency sensitive mirrors from the information transmitter 30 through the optical fiber waveguide 31 to the information receiver 32, while the alarm signals from the alarm transmitter 35 are reflected by the frequency sensitive mirrors, into the optical fiber waveguide 31 and from the waveguide into the alarm receiver 36. Optical coatings which reflect certain frequencies while passing other frequencies without reflection are well known in the art. Such coatings could be used for the frequency sensitive mirrors.

What is claimed is:

1. A secure fiber optics communication system comprising:
   an information transmitter for the generation of an information signal;
   an information receiver for receiving said information signal;
   an optical fiber having a frangible glass coating therearound, connecting said information transmitter and said information receiver for the transmission of said information signal, said frangible glass coating comprising glass having high internal stresses; and
   means for disabling said information transmitter upon an attempt to penetrate said optical fiber.

2. The communication system of claim 1 wherein said disabling means includes means for detecting a change in level of the signals transmitted through the optical fiber.

3. The communication system of claim 1 wherein said disabling means further includes:
   an alarm transmitter for generating alarm signals;
   an alarm receiver for receiving said alarm signals; and
   means for coupling said alarm transmitter and said alarm receiver to the optical fiber.

4. The communication system of claim 3 wherein said disabling means also includes means within the alarm receiver for detecting a change in level of said alarm signal and means connected to the information transmitter for disabling said information transmitter upon the detection by the alarm receiver of the change in level of said alarm signal.

5. The communication system of claim 4 wherein said alarm signal is disrupted by an attempt to penetrate the fiber.

6. The communication system of claim 3 wherein said alarm transmitter is located adjacent to said information receiver and said alarm receiver is located adjacent to said information transmitter.

7. The communication system of claim 6 wherein said alarm signal is transmitted through the same optical fiber as the information signal and in an opposite direction thereto.

8. The communication system of claim 7 wherein said alarm signal and said information signal are of the same frequency.

9. The communication system of claim 7 wherein said alarm signal and said information signal are of different frequencies.

10. The communication system of claim 1 wherein said optical fiber includes an opaque coating to prevent the external observation of the optical signals therein.

* * * * *